W. WASSON & G. W. DUNGAN.
Stove-Pipe Damper.
No. 130,456. Patented Aug. 13, 1872.
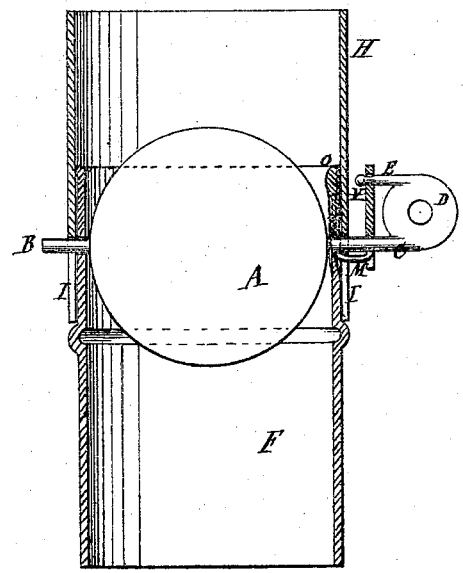
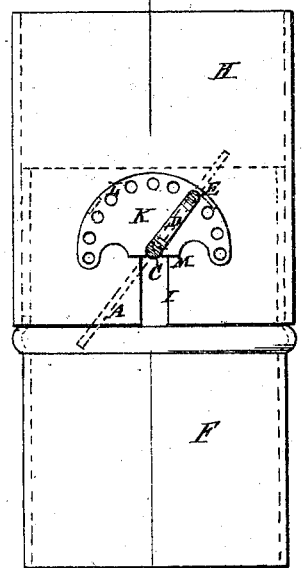
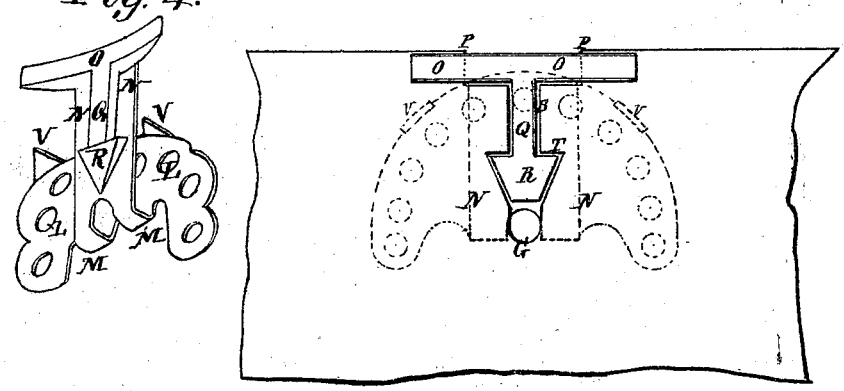

UNITED STATES PATENT OFFICE.

WARREN WASSON AND GEORGE W. DUNGAN, OF GENOA, NEVADA.

IMPROVEMENT IN STOVE-PIPE DAMPERS.

Specification forming part of Letters Patent No. 130,456, dated August 13, 1872.

Specification describing a new and useful Improvement in Stove-Pipe Dampers, invented by WARREN WASSON and GEORGE W. DUNGAN, of Genoa, in the county of Douglas and State of Nevada.

Our invention relates to improvement in the class of dampers and their attachments wherein the damper has its spindle prolonged for a handle or thumb-piece by which to turn the damper, and this thumb-piece has a stud-pin projecting backward toward the pipe, parallel with the journals, to enter any one of a series of holes in a circular line around the axis, for holding the damper closed or open, or partly open, the said pin being introduced to the holes or withdrawn by sliding the damper endwise on its axes. Our invention comprises a peculiar arrangement of the supports for the plate having the aforesaid series of holes for attaching it to the end of a section of pipe and allowing the other section to be joined to the one having the said plate attached, which said arrangement will be hereinafter described.

Figure 1 is a sectional elevation of a section of pipe with the damper and its adjuncts applied. Fig. 2 is a side elevation of two sections of pipe joined together and having the aforesaid damper fitted to them; and Fig. 3 is an inside elevation of a section of one joint of pipe, showing the manner of attaching the aforesaid plate for holding the damper; and Fig. 4 is a perspective view of the plate.

Similar letters of reference indicate corresponding parts.

A is a thin cast-metal disk, having one short journal, B, and another long one, C. This latter terminates in a thumb-piece, D, and said thumb-piece has a stud-pin, E, projecting backward toward the pipe, but not extending quite to it, and arranged as far from the journal C radially as the width of said thumb-piece will allow. This damper is to be put in a section of stove-pipe, F, near the upper end, so that the long journal can be let down to its bearing through a slot from the top, which is necessary because the journals are cast together with the disk, and, as the upper section H is required to extend down on the lower one further than to the bearings of the journals to form the joint properly, it has slots I for the journals. A plate, K, with a series of holes, L, in a circular line, is mounted on the side of the pipe, preferably above the journal C, for fastening the damper open or shut by engaging the stud-pin E in said holes, which is done by pushing the damper backward after turning it to the required position. The pin is disengaged from the plate for shifting the damper again by pulling the latter forward. For fastening this plate K to the pipes detachably, so that it may be applied to any section of pipe, a part, M, is bent backward from the lower edge to the pipe, and then upward, parallel with said plate, about as high as the top, to pass upward between the sections F and H, as shown in dotted lines at N, Fig. 3; and at the top is a cross-bar, O, which extends inside of the top of section F, at each end, through a wide notch, P, in said section, locking therewith so as to hold the plate from falling down, while the outer section of pipe H prevents said plate from coming off laterally; and, to prevent the plate from rising upward and sliding around the pipe laterally, a rib, Q, with a head, R, at the lower end, is fitted on the inside of part N, to be confined in the slot S and under the shoulders T, as clearly shown in Fig. 3. U represents studs at the upper edge of the plate, bearing against the pipe to prevent the plate from being pushed back. The lowermost hole at each end of the series is so placed relatively to the axis of the damper and the locking-pin E that when the said pin is in either the damper will be completely closed, and the uppermost hole of the series is so that when said pin is in it the damper will be completely open.

Having thus described our invention, we claim as new and desire to secure by Letters Patent—

1. The device shown in Fig. 4, constructed as described to adapt it to be attached to pipe, as specified.

2. The locking-plate K M N O Q R combined with the two sections F H, the one, F, being notched and slotted, as at P, S, and T, all substantially as specified.

WARREN WASSON.
GEORGE W. DUNGAN.

Witnesses:
H. F. SPENCER,
JAMES SHARKEY.